United States Patent

Fuchs

[11] Patent Number: 4,735,427
[45] Date of Patent: Apr. 5, 1988

[54] WHEEL HOUSING LINING FOR MOTOR VEHICLES

[75] Inventor: Lothar Fuchs, Pulheim, Fed. Rep. of Germany

[73] Assignee: Ford Motor Company, Dearborn, Mich.

[21] Appl. No.: 921,029

[22] Filed: Oct. 20, 1986

[30] Foreign Application Priority Data

Nov. 5, 1985 [DE] Fed. Rep. of Germany ....... 3539146

[51] Int. Cl.$^4$ ............................................. B62D 25/16
[52] U.S. Cl. .................................. 280/152 R; 296/198
[58] Field of Search ............ 280/154.5, 152 R, 153 R, 280/153 A; 296/78 R, 198; 297/DIG. 1, DIG. 2

[56] References Cited

U.S. PATENT DOCUMENTS

| | | | |
|---|---|---|---|
| 3,899,192 | 8/1975 | Reddaway | 280/154.5 R |
| 3,904,243 | 9/1975 | Kostelec et al. | 297/DIG. 2 |
| 4,248,646 | 2/1981 | Ginsberg | 297/DIG. 1 |
| 4,620,745 | 11/1986 | Jacobs | 296/198 |

FOREIGN PATENT DOCUMENTS

| | | |
|---|---|---|
| 0124093 | 7/1984 | European Pat. Off. . |
| 1555288 | 10/1970 | Fed. Rep. of Germany ...... 296/198 |
| 2908837 | 11/1980 | Fed. Rep. of Germany . |
| 3007760 | 8/1982 | Fed. Rep. of Germany . |
| 2116132 | 9/1983 | United Kingdom ................ 296/198 |

Primary Examiner—James T. McCall
Attorney, Agent, or Firm—Peter D. McDermott; Roger L. May

[57] ABSTRACT

A wheel housing lining for motor vehicles comprises a shell of plastic material adapted approximately to the contour of the wheel housing and secured thereto. The plastic material forming the shell is a needled plastic-fiber fleece material (7/6) which is adapted from sheet material by warm working to the contour of the wheel housing (2) and is secured in the wheel housing (2) by adhesion (8), gripping, screws or the like.

7 Claims, 2 Drawing Sheets

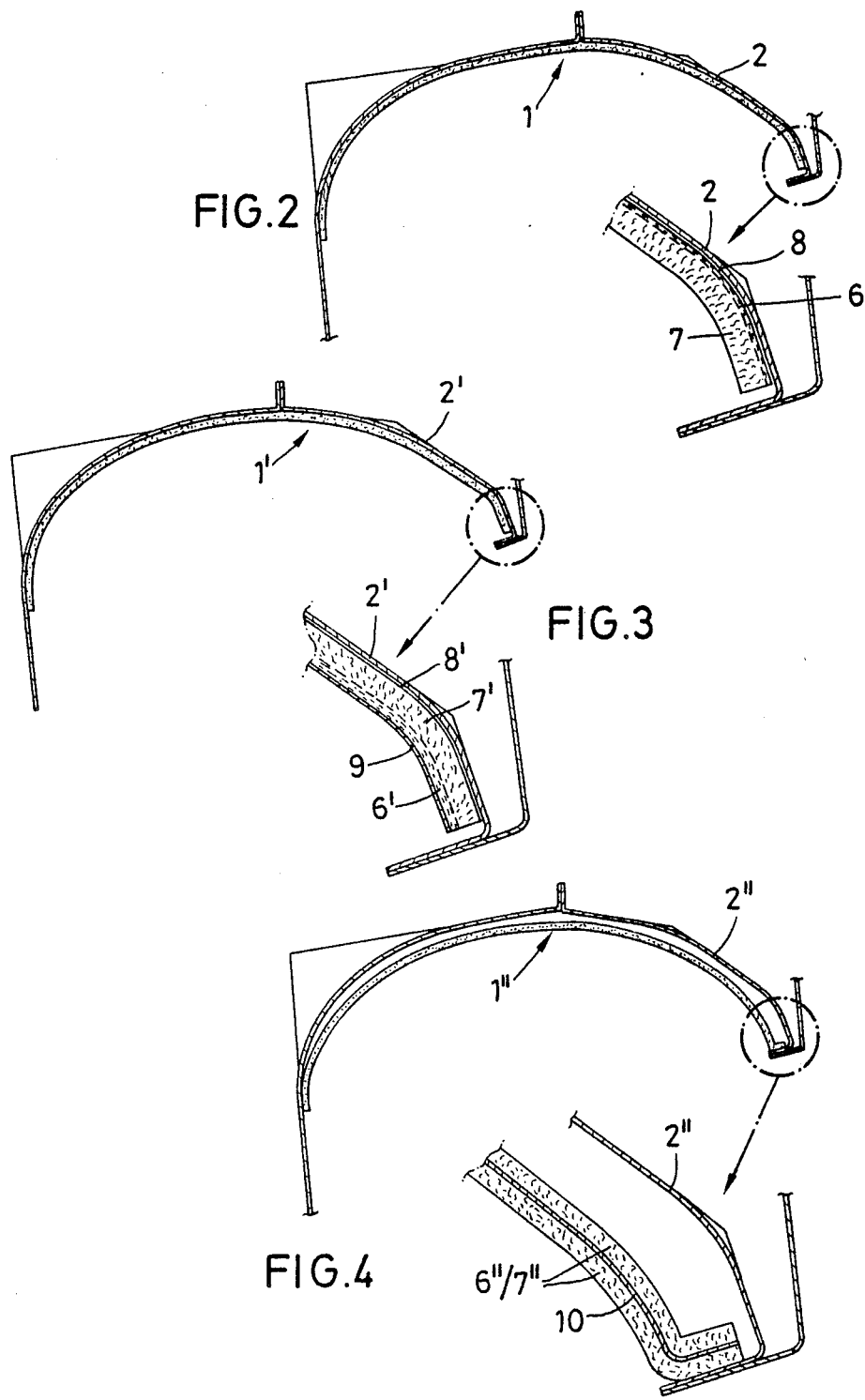

WHEEL HOUSING LINING FOR MOTOR VEHICLES

The invention relates to a wheel housing lining for motor vehicles, more specifically, to a wheel housing lining comprising a shell of needled plastic fiber fleece material.

A wheel housing lining for motor vehicles, comprising a shell of plastic materials adapted approximately to the contour of the wheel housing and secured thereto, is known from the German Offenlegungsschrift (Laid-Open Specification) No. 2,908,837. The purpose of this known wheel housing lining is to protect the mudguard positioned to the rear or the sheet metal wheel housing positioned to the rear from the corroding and sandblasting effect of muddy water thrown up by the wheel when in motion. The shell of plastic material consists accordingly of a relatively rigid plastic material, such as, for example, a polypropylene filled with mineral substances.

A wheel housing lining for motor vehilces is known also from German Pat. No. 3,007,760, which likewise comprises a shell of plastic material adapted approximately to the contour of the wheel housing and secured thereto. It is taught therein that it is necessary for the shell to consist of reinforced polyurethane resin which, again, is relatively rigid and smooth.

Wheel housing linings for trucks are known from European Specification No. 0,091,419 and from U.S. Pat. No. 3,899,192. These consist of plastic mats which are arranged adjacent the wheels of the truck on flat wheel housing surfaces and are provided with grass-like projections. This is intended primarily to reduce the substantial volume of spray which is produced by trucks at high speeds and which considerably impairs the vision of following motor vehicles.

Wheel housing linings according to the first three of the above-mentioned references are not suitable for making any significant contribution to the absorption of travel noises or the noise of the spray in the wheel housing of a motor vehicle. In addition, the plastic mats provided with grass-like projections according to U.S. Pat. No. 3,899,192 are very complicated to produce and they can only be deformed in a difficult and complex manner so as to be adapted to the narrow wheel housings of a passenger car.

An object of the present invention is to provide an improved wheel housing lining for motor vehicles, specifically, a wheel housing lining having improved sound insulation and which reduces the amount of spray thrown up by the wheels.

To attain the aforesaid objects, the present invention provides a wheel housing lining for the wheel housing of a motor vehicle, which lining comprises a needled plastic-fiber fleece material. The lining is secured to the wheel housing, for example, by adhesive, screws, clamping, etc. According to another aspect of the invention, the needled plastic fiber fleece lining is adapted from essentially planar sheet(s) of such material to the contour of the wheel housing by working such sheet material at elevated temperature, that is, by so-called warm working of the sheet material.

Further aspects and advantages of the invention will be apparent from the following disclosure of preferred embodiments.

As noted above, the plastic material forming the shell is a needled plastic-fiber fleece material which is adapted from sheet material by warm working to the contour of the wheel housing and is secured in the wheel housing by adhesion, gripping, screws or the like. With this simple application of material, both a substantial improvement of the absorption of the noise of rolling and of splashed water in the wheel housing can be achieved and, in addition, the spray thrown up by the wheels can be caught and reduced by the porous surface of the lining material.

In this connection the rear side of the plastic-fiber fleece material can be made impermeable to water and adhesible by an appropriate coating and can be secured in the wheel housing over its entire area.

For preferred sound insulation the plastic-fiber fleece material can be secured to the wheel housing over its entire area by adhesion and can be made impermeable to water on its front side by a coating of elastic plastic material.

For special sound insulation and spray reduction the plastic-fiber fleece material can be applied to both sides of a warm-workable base material, which reinforces the wheel housing lining in such a way that it can be secured by gripping or screwing to the wheel housing even at a distance.

The invention is explained in greater detail with reference to embodiments illustrated in the drawings, in which:

FIG. 2 is a section through a wheel housing lining with an embodiment of the material of the wheel housing lining shown on an enlarged scale;

FIG. 3 is a section through a wheel housing lining with a further embodiment of the material of the wheel housing lining shown on an enlarged scale, and FIG. 4 is a section through a wheel housing lining with a further embodiment of the material of the wheel housing lining shown on an enlarged scale.

Figure 1:
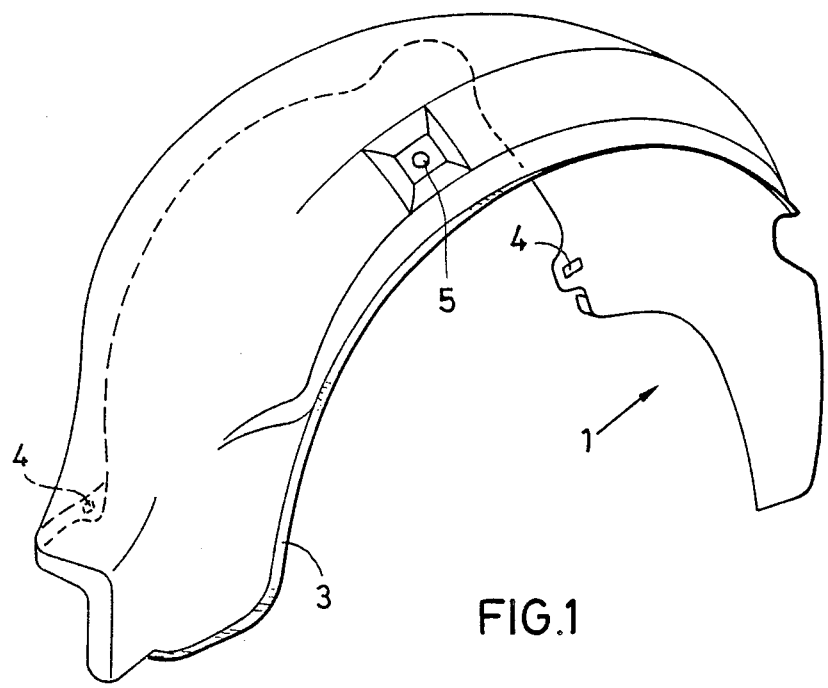
FIG. 1 is a perspective view of a wheel housing lining for motor vehicles according to the invention.

A wheel housing lining 1 for a rear wheel housing of a motor vehicle body is shown in a perspective view in FIG. 1. The shell housing itself typically might be constructed of formed sheet metal. The wheel housing lining 1 is adapted approximately to the contour of the sheet metal wheel housing and forms a shell of plastic material which can be secured to the sheet metal of the wheel housing by way of fastening means such as gripping edges 3 and clips 4 or screw connections 5.

In this connection, the particular feature of the wheel housing lining according to the invention for motor vehicles lies in the plastic-fiber fleece material used, the arrangement of which is explained with reference to FIGS. 2 and 4.

A very simple embodiment of the wheel housing lining 1 may be seen in FIG. 2 in which plastic fiber 7 needled onto a fleece material 6 forms a sheet material which is adapted to the contour of the wheel housing 2 by warm working and is joined to the wheel housing of sheet metal over its entire area by a coating of adhesive 8.

In this connection, the open-pore surface of the needled plastic-fiber fleece material ensures both good sound insulation on the one hand and a proper reduction of spray on the other. Although mud can accumulate on the open-pore surface of the plastic-fiber fleece material 6, it has been found that when travelling over normal roads which are wet with rain the mud is to a great extent washed off again. This is due to the jet-like action of the splashed water.

A further embodiment of the invention may be seen in FIG. 3, in which for preferred sound insulation the plastic-fiber fleece material 6' is provided on its rear side (that is, on the surface which faces the sheet metal wheel housing 2') with an adhesive coating 8' for securing the wheel housing lining 1' to the wheel housing 2'. The front side of the plastic-fiber fleece material 6' is made impermeable to water by a coating 9 of elastic plastic material. Such embodiment is preferred for motor vehicles which are used off normal roads and in which dirt might otherwise constantly accumulate on the open-pore surface of the plastic fiber fleece material 6'.

A further embodiment of the invention may be seen in FIG. 4, in which a plastic-fiber fleece material 6" is arranged on both sides of a warm-workable base material 10. The base material 10 reinforces the wheel housing lining 1" in such a way that it can be secured in a sheet metal wheel housing 2" even at a distance from the wheel housing 2" by gripping, screws and the like. Such a design is particularly suitable for the front wheel housings in motor vehicles, in which the covering of the front wheels is to an increasing extent no longer provided by a mudguard of sheet metal but, rather, by a wheel housing free-standing in the engine space.

I claim:

1. A wheel housing lining for a wheel housing of a motor vehicle, comprising a shell of plastic material having approximately the contour of the wheel housing and secured thereto, said plastic material comprising a needled plastic-fiber fleece material.

2. The wheel housing lining according to claim 1, wherein said plastic material further comprises a substantially water impermeable plastic coating on said needled plastic-fiber fleece material.

3. The wheel housing lining according to claim 1, characterized in that said needled plastic-fiber fleece material has an area of contact with the wheel housing and is secured to the wheel housing by a coating of adhesive substantially co-extensive with said area of contact.

4. The wheel housing lining according to claim 3, wherein said area of contact is substantially the entire surface area of said needled plastic-fiber fleece material facing said wheel housing.

5. The wheel housing lining according to claim 3, wherein said adhesive renders said needled plastic-fiber fleece material impermeable to water.

6. The wheel housing lining according to claim 1, characterized in that substantially the entire surface area of said needled plastic-fiber fleece material facing said wheel housing is in contact therewith and is adhered thereto and rendered water impermeable by a coating of adhesive on said entire surface area, said wheel housing lining further comprising a coating of water impermeable elastomeric material on the side of said needled plastic-fiber fleece material which is opposite that facing said wheel housing.

7. The wheel housing lining according to claim 1, wherein a sheet of said needled plastic-fiber fleece material is carried on each side of a warm-workable base material, said wheel housing lining being securable to said wheel housing by attachment to said base material.

* * * * *